US012103865B1

United States Patent
Alaraik et al.

(10) Patent No.: US 12,103,865 B1
(45) Date of Patent: Oct. 1, 2024

(54) FREEZING DESALINATION SYSTEM USING THERMOELECTRIC COOLERS

(71) Applicant: KING SAUD UNIVERSITY, Riyadh (SA)

(72) Inventors: Khalid Abdullah A. Alaraik, Riyadh (SA); Fahad Ibrahim Aldawish, Riyadh (SA); Obida Mohamed Zeitoun, Riyadh (SA); Abdullah O. Nuhait, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/586,087

(22) Filed: Feb. 23, 2024

(51) Int. Cl.
*C02F 1/22* (2023.01)
*C02F 1/00* (2023.01)
*F25B 21/02* (2006.01)
*C02F 103/08* (2006.01)

(52) U.S. Cl.
CPC .............. *C02F 1/22* (2013.01); *C02F 1/008* (2013.01); *F25B 21/02* (2013.01); *C02F 2103/08* (2013.01); *C02F 2209/02* (2013.01)

(58) Field of Classification Search
CPC .... C02F 1/22; C02F 1/265; C02F 1/24; C02F 1/008; C02F 2103/08; C02F 2209/02; F25B 21/02; F25B 21/04; F25B 21/00; F25B 2321/02; F25B 2321/021; F25B 2321/0212; F25B 2321/023; F25C 5/20; F25C 5/02
USPC ............... 62/3.2, 3.6, 3.63; 210/774; 203/10
See application file for complete search history.

(56) References Cited

U.S. PATENT DOCUMENTS

| | | | |
|---|---|---|---|
| 3,212,999 A | 10/1965 | Sommers | |
| 5,231,852 A * | 8/1993 | Conlon | B01D 17/048 62/532 |
| 5,720,171 A * | 2/1998 | Osterhoff | A47J 36/2461 62/298 |
| 2018/0354813 A1* | 12/2018 | Rho | B01D 9/0059 |

FOREIGN PATENT DOCUMENTS

WO     WO-2018148247 A1 *   8/2018   ........... B01D 1/0058

OTHER PUBLICATIONS

Mahmoud Elgendi, et al., "Improving the solar still productivity using thermoelectric materials: A review", Alexandria Engineering Journal, vol. 65, pp. 963-982, First available online Oct. 11, 2022.

(Continued)

*Primary Examiner* — Frantz F Jules
*Assistant Examiner* — Devon Moore
(74) *Attorney, Agent, or Firm* — Nath, Goldberg & Meyer; Joshua B. Goldberg

(57) ABSTRACT

A freezing desalination method includes cooling salt water in a first chamber with a conductive interface having a thermoelectric cooler (TEC). The conductive interface separates the first chamber from the second chamber containing fresh water. The method further includes reversing a current supplied to the conductive interface by a power source, when ice forms on the conductive interface, thereby allowing the ice to detach from the conductive interface. The ice formed in the first chamber is moved to the second chamber with a moving mechanism thereby melting the ice in the second chamber.

14 Claims, 5 Drawing Sheets

(56) References Cited

OTHER PUBLICATIONS

Hayder Sami Saleh Al-Madhhachi, "Solar Powered Thermoelectric Distillation System", Institute of Energy School of Engineering Cardiff University, Thesis, pp. i-xxvi and 1-177, Dec. 2017.

Mohammad Tariq Nasir, et al., "High productivity thermoelectric based distiller", Desalination and Water Treatment, 206(2020), pp. 125-132, Dec. 2020.

Setia Budi Sasongko, et al., "Experimental study on thermoelectric module's heating and cooling performance", IOP Conference Series: Materials Science and Engineering, 1053 (2021) 012127, pp. 1-11.

* cited by examiner

FREEZING DESALINATION SYSTEM USING THERMOELECTRIC COOLERS

BACKGROUND

1. Field

The present disclosure relates to water desalination, and particularly to water desalination systems and methods.

2. Description of the Related Art

Water desalination is a process where salt is separated from seawater. This process is an expensive and complicated one. This raises the question of why it is done. Water has always been vital for humans and all living creatures. As the years progress, the demand for freshwater increases. This induces pressure on water resources. In 2017, 3,881 billion cubic meters of freshwater were extracted from the Earth. This pressure on fresh water resources does not seem to be decreasing any time soon. In fact, this pressure is expected to accelerate in the upcoming years as the world's population continues to grow. In many parts of the world, water resources have become so depleted and contaminated that the ever-increasing demand for fresh water is unable to be met. Around 71% of the earth's surface is water. That is approximately 1.386 billion $km^3$ of water. However, only 0.5 percent of the total water on Earth is readily available for human use. The rest of the water is in the oceans or other saltwater sources, which represents 97% of the earth's water being undrinkable (too salty), or fresh inaccessible water (deep into the earth, ice caps, etc.).

This brings back to the question of why desalinate sea water. Water desalination is one way to keep up with this increase in demand for freshwater. According to the World Watch Institute, more than two-thirds of the world's population may experience water shortages by 2025. Water desalination might help solve this problem. The need for desalination of sea water is something that cannot be ignored. More than 16,000 desalination plants now produce about 95 million cubic meters per day of fresh water.

Water desalination is essentially the separation of saline water into a low-salt concentration part, and a high-salt concentration part (Brine). Currently, there are two major techniques widely used to separate salt from water. There is the thermal approach and there is the membrane approach. There are also other unpopular approaches such as chemical desalination and freezing desalination.

Thermal water desalination mimics the natural water cycle on earth, where water evaporates from the oceans due to the heat gained from the sun, then is condensed giving a liquid free of salt. This also is referred to as distillation, e.g. the evaporation and condensation of a liquid. Using this method has some advantages over membrane desalination. One advantage is that it is less susceptible to fouling since there are no membranes, meaning that there is almost no change in water quality with usage. There are different thermal methods to desalinate water, but they follow the same concept with slight differences. One of the thermal desalination processes is multi-stage flash distillation (MSF). The MSF desalination process is capable of high plant availability. It is reasonably tolerant to seawater salinity and anti-scale control variation and is highly reliable with steady behavior. For this method, seawater is heated under high pressure, and then enters a chamber kept at a very low pressure. This high temperature and low pressure, suddenly make the water boil, turning it to vapor. Hence it is named "flash". In practice, there are many chambers where the pressure decreases gradually in each successive chamber.

There is also a multiple-effect distillation method (MED). While currently, MSF is the dominant type of large-scale thermal desalination technology in use, from a thermodynamic and heat transfer point of view MED is more efficient. MED is currently receiving considerable attention as a strong competitor to MSF. The MED method boils the saline water at low temperatures by reducing the water's pressure. The water begins to evaporate, the vapor is passed to the next stage to be condensed to fresh liquid water and generate new vapor. Utilizing this multi-effect concept reduces the energy needed for desalination.

In membrane water desalination, the membrane is a barrier capable of allowing for the passage of some substances, while preventing others. In desalination, the membrane allows only the pure water to pass and holds the salt and minerals back. There are many alternatives when using this approach, such as the reverse osmosis (RO) method, where pressure is the driving force, or Electro-dialysis, where a voltage difference is the driving force. Note that among all the membrane methods, reverse osmosis is the most widely used. It is one of the most used methods among all the desalination technologies. Seawater desalination through membrane technology represents one of the unique successes of membrane technology. It is probably one of the clearest examples of how the principles of process intensification can be achieved.

In Reverse Osmosis (RO), fresh water is forced to move from the high-concentration membrane side to the low-concentration side. This is exactly the opposite of the osmotic natural phenomenon, where a solvent would move from the low-concentration side to the high-concentration side. In RO technology, energy must be expended, in the form of pressure. Nevertheless, reverse osmosis allows for the desalination of water through an energy-efficient technology, producing fewer $CO_2$ emissions related to the energy consumed, with less highly concentrated brine to be disposed of as waste.

SUMMARY

Freezing desalination is an interesting method for water desalination. It has a huge potential. The main aim is to integrate the TEC devices in a freezing desalination system to act as a heat pump.

A freezing desalination system, in one embodiment, includes a first chamber and a second chamber. A conductive interface separates the first chamber from the second chamber. The conductive interface has a cooling/heating device, such as a thermoelectric cooler. A power source supplies power to the interface such that the first chamber is cooled and the second chamber is heated.

The freezing desalination system further includes a moving mechanism moving ice from the first chamber to the second chamber, thereby melting the ice in the second chamber.

A controller adjusts the temperature of the cooling/heating device to form ice in the first chamber and moves the ice from the first chamber to the second chamber with the moving mechanism.

The controller reverses the current being supplied to the cooling/heating device so that ice formed on the conductive interface separates from the conductive interface.

The controller signals a moving mechanism to move the ice from the first chamber to the second chamber.

The first chamber and second chamber are insulated to minimize heat conductivity.

The first chamber and second chamber are made of a material to minimize heat conductivity.

The cooling/heating device is a thermoelectric cooler (TEC) in some embodiments.

A freezing desalination method includes cooling salt water in a first chamber with a conductive interface having a cooling/heating device. The conductive interface separates the first chamber, containing salt water, from the second chamber, containing fresh water. The current being supplied to the conductive interface by a power source is reversed, when ice forms on the conductive interface, thereby allowing the ice to detach from the conductive interface. The ice is then moved from the first chamber to the second chamber with a moving mechanism. The ice then melts in the second chamber.

The temperature of cooling/heating device is adjusted with a controller to form ice in the first chamber.

The current being supplied to the cooling heating device is reversed with the controller so that ice formed on the conductive interface in the first chamber separates from the conductive interface.

These and other features of the present subject matter will become readily apparent upon further review of the following specifications.

BRIEF DESCRIPTION OF THE DRAWINGS

Similar reference characters denote corresponding features consistently throughout the attached drawings.

DETAILED DESCRIPTION OF THE PREFERRED EMBODIMENTS

Fresh water on earth is increasing in demand. Desalination of seawater is one way to keep up with that demand. The current desalination technologies use a huge amount of energy. It is supplied by burning fossil fuels, thereby harming the environment. A freezing desalination system will overcome deficiencies of the prior art. Freezing desalination requires the least amount of energy for desalinating water out of all other technologies.

Figure 1:
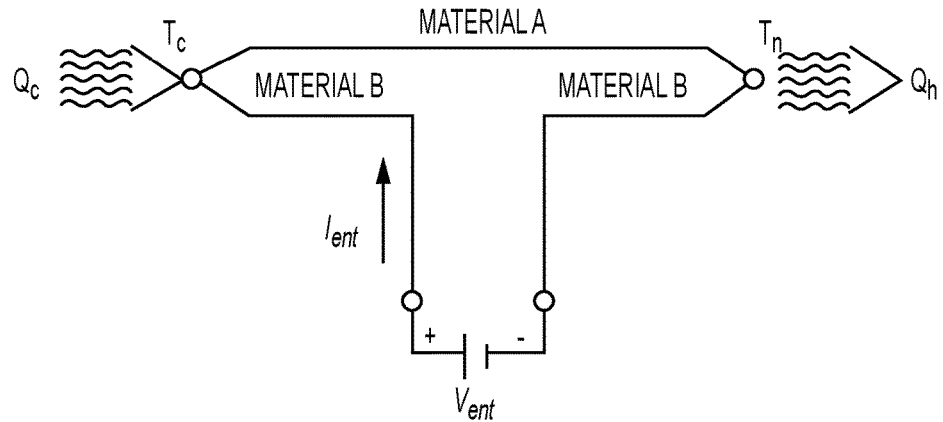
FIG. 1 is an illustration of the Peltier effect.

A freezing desalination system using a cooling/heating device, such as a thermoelectric cooler, can be powered by solar energy. A thermoelectric cooler (TEC) is a device that works based on the Peltier effect. The Peltier effect is the heat liberation at one junction of a thermocouple, and heat sorption at the other, when an electric current flows in the circuit. It is the opposite of the Seebeck effect, which uses the temperature difference between two different electrically conductive metals to generate a voltage difference. FIG. 1 is an illustration of the Peltier effect.

Figure 2:
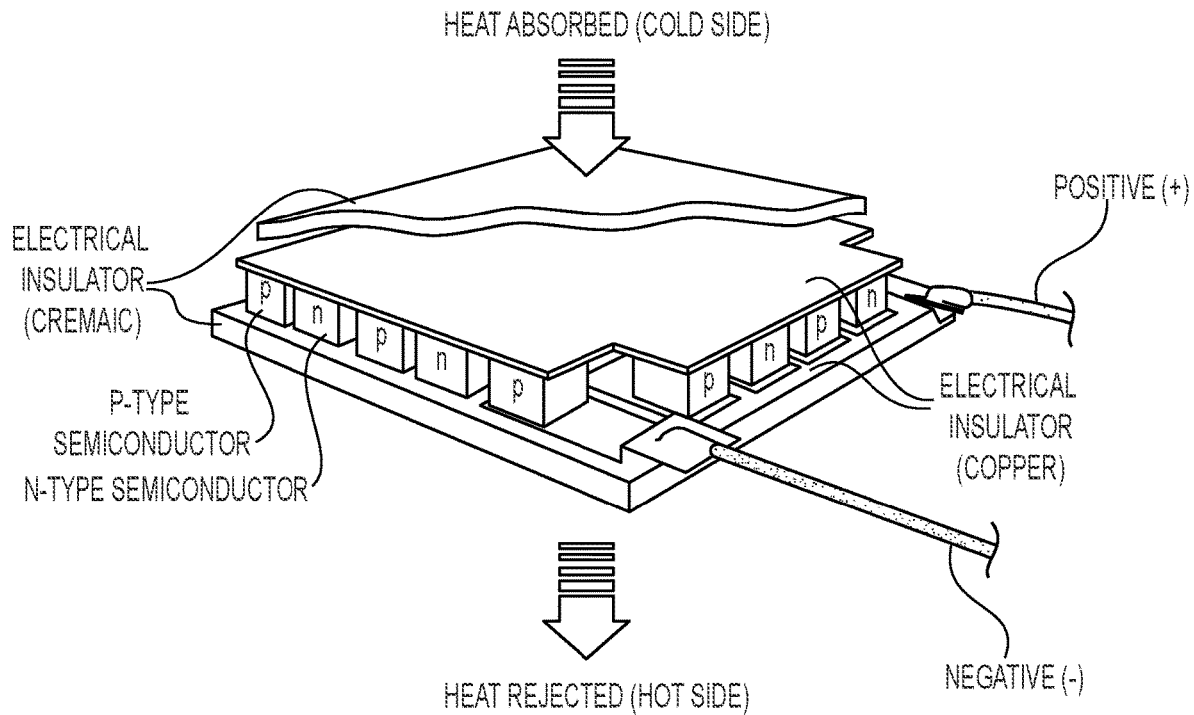
FIG. 2 is an illustration of a thermoelectric cooler (TEC).

In a TEC unit there is an n-type and a p-type semiconductor. The semiconductors transfer heat when the electric current flows across the thermoelectric elements. For the actual units, there are many n-type and p-type semiconductors in series, sandwiched between two thin electric insulators of ceramic that protect the semiconductors and adds a rigidity to them as show in FIG. 2.

TEC units come in different shapes, capabilities, and arrangements. One must be careful when choosing a unit for a particular application. If the application requires a huge temperature difference between the TEC sides, two stages of the unit connected back-to-back may be a better choice.

TECs are being used in many applications. They are mainly used for cooling only or cooling and heating simultaneously. The device is usually used for small systems, such as a small refrigerator, or for cooling small electronic devices, such as a CPU.

There are of course steps for choosing the right unit. Choosing the right unit mainly depends on two variables: the desired heat to be rejected, and the desired temperature difference between the cold and hot sides of the unit. The next step is to find a unit that satisfies these variables. This is done either by finding the voltage and current using the performance sheet for a unit, or by calculating the maximum cooling that a unit can provide using the following equation:

$$Q_{max} = \frac{Q}{1 - \frac{dT}{dT_{max}}}$$

This provides a lower limit when choosing a unit. It also provides the designer with various choices. It is important to note that always choosing the highest $Q_{max}$ would negatively affect the coefficient of performance (COP) of the system. It is essentially an indication of how efficient a heat pump is.

Figure 3:
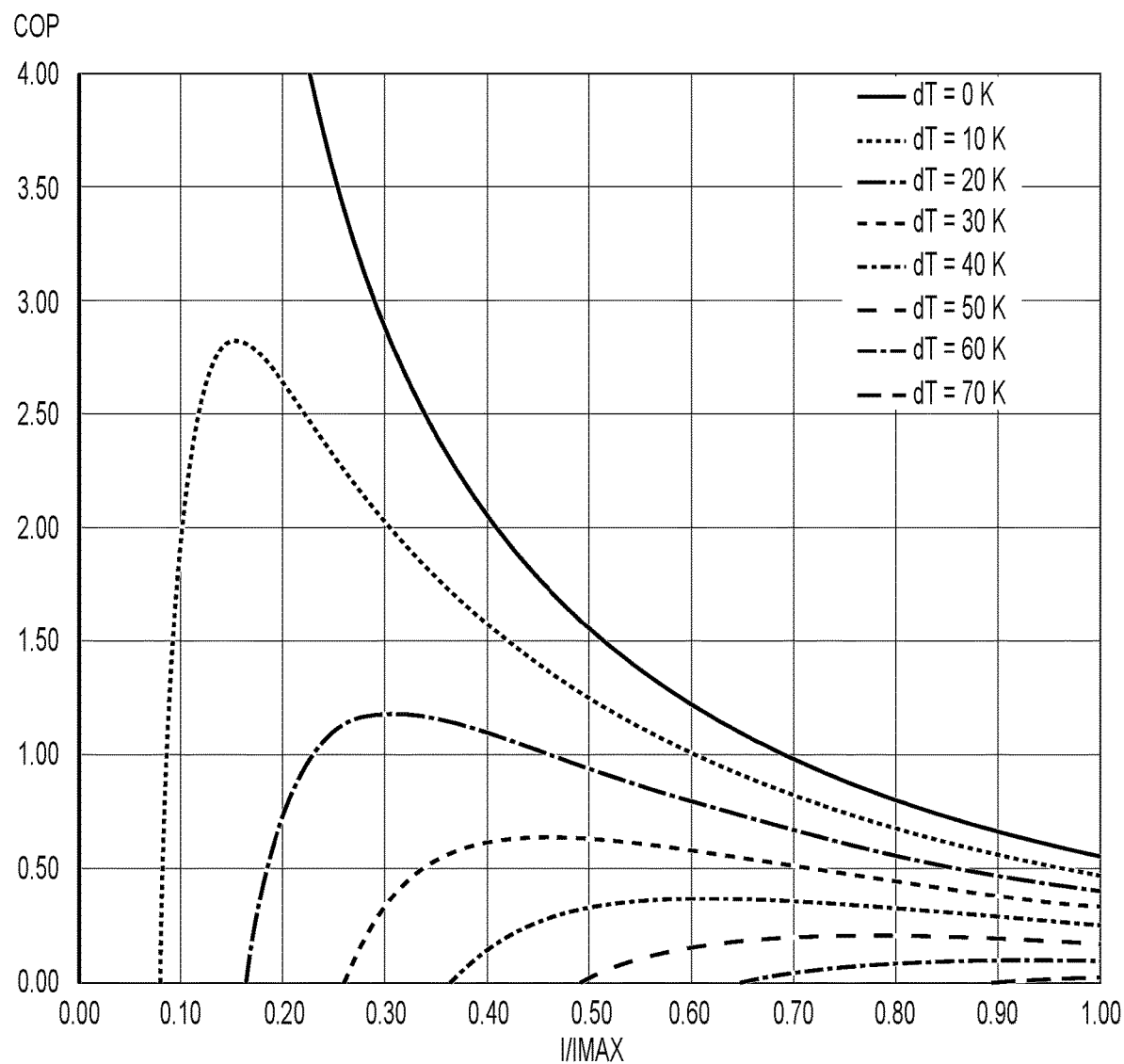
FIG. 3 is an illustration showing the effect of temperature difference of between the two sides of a TEC in relation between the coefficient of performance COP and current.

Since this is a design for a refrigeration system, the coefficient of performance is the way to measure the efficiency of the system. FIG. 3 shows the effect of temperature difference between the two sides of the TEC on the relation between the COP and the current. As we decrease dT, the COP increases. The higher the COP the better the system is in cooling.

One tries to obtain a high COP by reducing the temperature difference across the TEC as much as possible. Therefore, the ice formed on the cold side will be used to cool the hot side. This will reduce the temperature difference between the two sides of the TEC unit.

Desalination by freezing essentially is thermal desalination. Since freezing evolves from pumping the heat, freezing desalination is a freezing-melting technology where freshwater in the form of ice is separated by cooling a salt-water solution. This approach consists of three main steps. The first is to freeze the water, the second is to separate the ice crystals (consisting of pure water) from the saline water, and the third is to melt the ice. This Technology for water desalination requires significantly less energy than all the other desalination technologies. Compared to other desalination methods freezing desalination has the lower energy usage since the latent heat of fusion is approximately 333.5 KJ/kg. This is almost one-seventh of the latent heat of vaporization 2256.7 KJ/kg. This huge savings in energy makes it an attractive way to desalinate water. This method does not allow any pollution to occur in the water during heat removal from the seawater. Ice crystals which are composed purely of water are formed. As a result, any impurities, or solutes like salts and pathogens are transferred to the adjacent solution. It is also less compromised to any fouling or corrosion.

Freezing a product is usually accomplished one of two ways: direct freezing or indirect freezing. In the case of direct freezing, the product which is to be frozen is in direct contact with the medium used for freezing. Indirect freezing, on the other hand, is done with a barrier between the product and the medium. Indirect freezing is most used between the two ways. Sea water represents the product in the present disclosure.

A freezing desalination system using a thermoelectric cooler for heat rejection can supply fresh water and be environmentally friendly. The system can easily connect to solar panels, and a prober battery can be used to supply power. This novel idea will also solve the burning of fossil fuel problem, with the power being supplied by solar energy. Using a thermoelectric cooler as the heat pump will reduce the cost of freezing desalination even more so, since it reduces the parts used in the system by a substantial amount.

Figure 4:
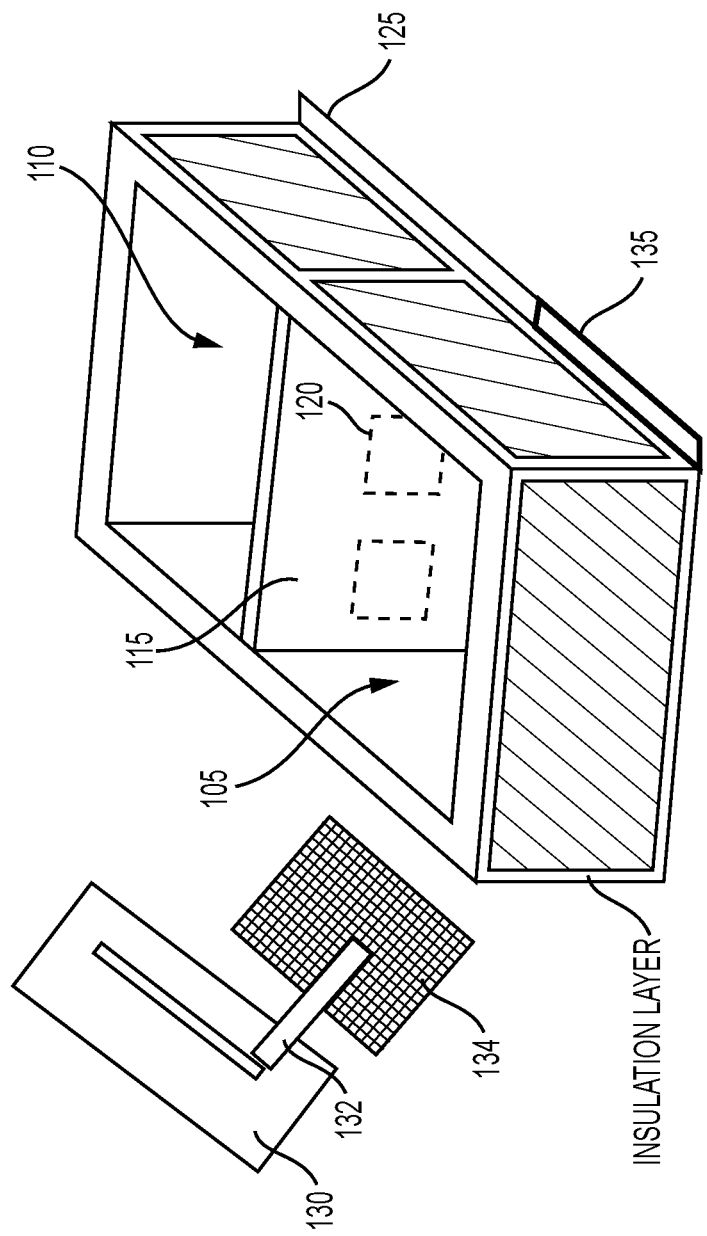
FIG. 4 is an illustration of a freezing desalination system using thermoelectric coolers.

FIG. 4 is an illustration of a freezing desalination system using thermoelectric coolers. A first chamber 105 and a second chamber 110 are separated by a conductive interface 115. The conductive interface 115 has a cooling/heating device 120, such as a thermoelectric cooler that works based on the Peltier effect. A power source 125 supplies power to the conductive interface 115 such that the first chamber 105 is cooled and the second chamber 110 is heated. The power source 125 is in some instances solar powered.

The freezing desalination system further includes a moving mechanism 130, moving ice from the first chamber 105 to the second chamber 110, thereby melting the ice in the second chamber 110. The moving mechanism 130, in this illustrated embodiment, has an arm 132 that moves a mesh platform 134 from the first chamber 105 to the second chamber 110. The mesh platform 134 is initially placed in the first chamber 105. Once ice is separated from the cold surface of the first chamber 105, the mesh platform 134 is moved upwards lifting the ice out of the first chamber 105. The arm 132 then moves the mesh platform 134 and the ice to the second chamber 110 to be melted.

A controller 135 adjusts the temperature of the cooling/heating device 120 to form ice in the first chamber 100 and move the ice from the first chamber 105 to the second chamber 10 with the moving mechanism 130.

The controller 135 reverses current being supplied to the cooling/heating device 120 so that ice formed on the conductive interface 115 separates from the conductive interface 115.

The controller 135 signals the moving mechanism 130 to move the ice from the first chamber 105 to the second chamber 110.

The first chamber 105 and second chamber 110 are insulated to minimize heat conductivity, and are made of a material to minimize heat conductivity.

The cooling/heating device 120 is a thermoelectric cooler (TEC) in some embodiments.

The cooling/heating device 120/Peltier unit is determined by calculating the required power and the temperature difference between the two tanks.

The cooling capacity needed to freeze 10 kg of water during t=24 hr includes two parts; the first is to cool the water from room temperature 20° C. to the ice temperature 0° C., and the second is the cooling required to freeze the water.

$$Q = \frac{mC_p \Delta T_{water}}{t} + \frac{mh_{fg}}{t}$$

where m is the mass of formed ice, $h_{fg}$ is the latent heat for water freezing (around 333 kJ/kg), and $C_p$ is the water heat capacity of 4.2 (KJ/kg K).

Now, using the above thermodynamic analysis allows for the determination of the desired Q as:

$$Q = \frac{10(\text{kg}) * 4200\left(\frac{J}{\text{kg}K}\right) * (20-0)(K)}{24(\text{hour}) * 60\left(\frac{\min}{\text{hour}}\right) * 60\left(\frac{\sec}{\min}\right)} + \frac{10(\text{kg}) * 333 * 10^3\left(\frac{J}{\text{kg}}\right)}{24(\text{hour}) * 60\left(\frac{\min}{\text{hour}}\right) * 60\left(\frac{\sec}{\min}\right)}$$

$$Q = 48.26 W$$

This is the refrigeration capacity, Q=48.26 W, to produce 10 kg of ice in 24 hr. keeping in mind that these are the ideal case calculations, no heat loss is being considered. To find the maximum energy, from which the Peltier unit is chosen, the following equation is used:

$$Q_{max} = \frac{Q}{1 - \frac{dT}{dT_{max}}}$$

resulting in:

$$Q_{max} = \frac{Q}{1 - \frac{\Delta T_{TEC}}{\Delta T_{max}}}$$

$\Delta T_{max}$, it is usually around 70° C. for a single stage unit. If the temperature difference is maintained at 10° C. across the TEC, then $$Q_{max} = \frac{48.26}{1 - \frac{10}{70}}$$

$Q_{max}$=56.30 W

From which any Peltier unit that could handle at least a 60 W load is considered. After searching the market for the available Peltier units, a TEC1-12706 with $Q_{max}$=60 W and $V_{max}$=12 V was chosen. The goal is to be able to freeze 10 L of water per day. This will be done using more than one TEC unit.

Designing the electric circuit of the TECs is crucial. The connection of these TEC units will result either in a higher or a lower COP. The proper connection is based on two facts:
  TECs have a high COP when the current passing through them is low
  TECs have a higher COP when operating under low-temperature differences between the sides of the unit.

Figure 5:
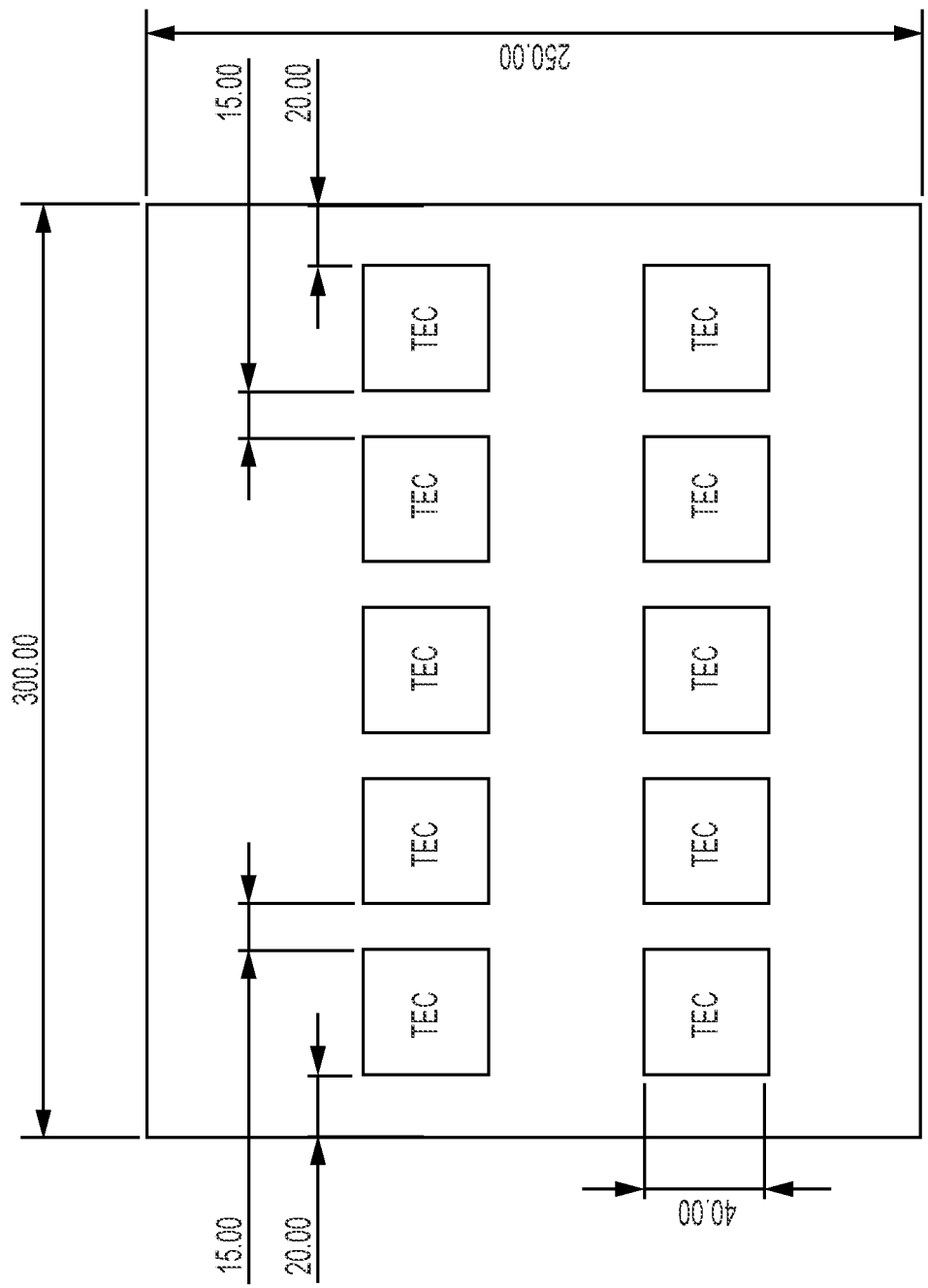
FIG. 5 is an illustration of a layout of TECs.

The system should operate under a low-temperature difference between the sides of the TEC. By adding the ice formed in the cold chamber to the hot chamber, a low-temperature difference can be maintained. The goal is to have a temperature difference of less than or equal to 10 degrees Celsius To achieve a low operational current, one must design the connection circuit of the TECs. The following was used to design the TEC circuit:

1) The optimum current ratio is about 0.16, keeping in mind that the TEC chosen has a maximum current of 6 Amperes.
2) From the above step, the best operational current is 0.96 A.
3) Now the voltage provided to the system must be specified. A DC voltage difference of 10 V was arbitrarily selected.
4) To have the units working under 10 volts, with 0.96 amperes of current passing through each unit. Also to keep the units relaxed, far from their operational limit (in order for the units to have a long operational life), 10 TEC units are used.
5) Those 10 units are connected in a combination of series and parallel connections. The TECs are laid out as illustrated in FIG. 5.
6) After connecting the units, the dimensions of the sheets are found (30 cm×45 cm×25 cm). The walls of the two chambers are well-insulated to reduce heat transfer to the system.

The width of the system is 30 cm, and the length and height are chosen to achieve 10 L of fresh water. That is 0.01 cubic meters.

The system is made up of three main parts: the body (made of Plastic sheets), the TEC units, and the holding sheets. However, additional supplies are required such as:

Silicon: Prevent leakage and hold some parts together.
Superglue and Silicon: To hold some parts together and prevent leakage.
Thermal paste: Between the TECs and the sheets.
Polystyrene for insulating the body.
T-Wire connectors: For connecting the TECs.

The assembly of the system's components begins with the construction of the body. Assembling the body can be done by using plastic sheets and plastic-made supports.

The TECs are connected and then thermally pasted to the sheets. Silicon is applied in between the sheets to keep the sheets from falling off.

The final system is assembled using silicon, super glue, and thermal insulation.

Figure 6:
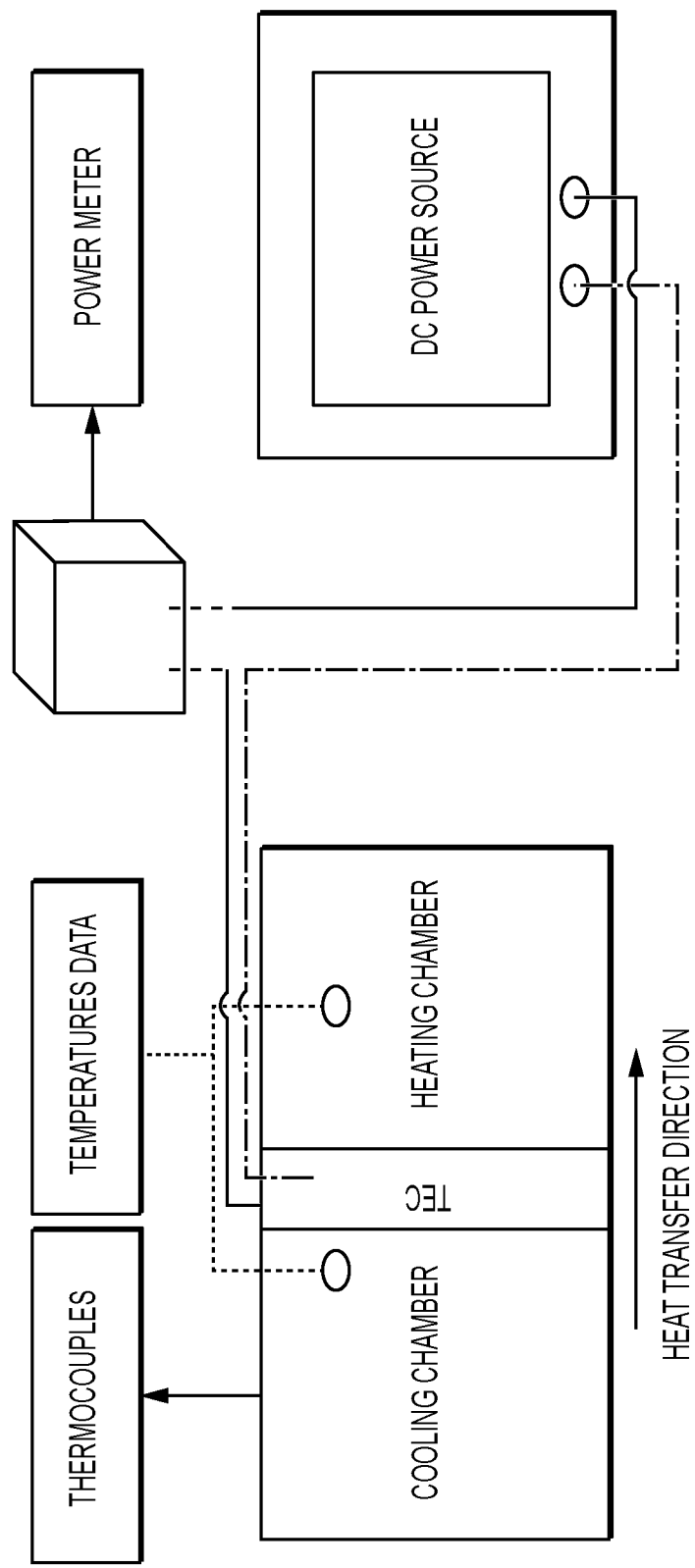
FIG. 6 is a schematic illustration of a freezing desalination system using thermoelectric coolers.

A schematic of the system is shown in FIG. 6. Thermocouples are arranged as shown with at least two on the surfaces. It is important to attach one on the cooling surface higher than the icing region so that the formed ice will not affect the temperature readings.

To improve system COP, it is assumed that the system will operate for a long time with a very small temperature difference across the TECs. The ice produced on the cold side will be moved to the hot side to cool the TEC system. When the system reaches a steady state, the temperature difference across the TEC modules will be very small. This procedure will improve the COP. To simulate this situation, the following procedure is used.

1. Insert thermocouples in appropriate locations, support two on the walls using tape, and distribute the others throughout the two chambers.
2. Connect the power meter to measure the volt, ampere and power.
3. Prepare the water. The water must be less than 1 degree Celsius, for both sides of the system.
4. Choose the hot and cold chambers.
5. Carefully, pour the water and ice into the two chambers. Most of the ice is put in the chamber that is being heated.
6. Plug the DC source to the electricity source.
7. Connect the DC source to the TEC. Make sure that the connection provides the same hot and cold surfaces as the ones chosen in step 4.
8. Run the system. Record the temperatures, volt, and ampere.
9. Once freezing begins, record the time for later calculations.
10. Separate the formed ice from the cooling chamber by reversing the current.
11. Measure the ice mass in kg and move it to the hot side chamber.

Measuring the ice could be achieved either by melting the ice, measuring its volume in Liters; or by using a scale to measure the weight. Finally, save the temperature readings of the data acquisition device, rearrange the current back to its original configuration, and turn off the power.

A freezing desalination method, in one embodiment, includes cooling salt water in a first chamber with a conductive interface having a cooling/heating device. The conductive interface separates the first chamber, containing salt water, from the second chamber, containing fresh water. The current being supplied to the conductive interface by a power source is reversed, when ice forms on the conductive interface, thereby allowing the ice to detach from the conductive interface. The ice is then moved from the first chamber to the second chamber with a moving mechanism. The ice then melts in the second chamber.

The temperature of the cooling/heating device is adjusted with a controller to form ice in the first chamber.

The current being supplied to the cooling heating device is reversed with the controller so that ice formed on the conductive interface in the first chamber separates from the conductive interface.

The controller, in some embodiments, detects when 6.5 minutes has elapsed and reverses the current automatically.

It is to be understood that the freezing desalination system using thermoelectric coolers and method for freezing desalination using thermoelectric coolers are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A freezing desalination system, comprising:
    a first chamber and a second chamber;
    a conductive interface separating the first chamber from the second chamber, the conductive interface having a cooling/heating device;
    a power source supplying power to the conductive interface such that the first chamber is cooled and the second chamber is heated, and
    a moving mechanism moving ice from the first chamber to the second chamber and melting the ice in the second chamber.

2. The freezing desalination system as recited in claim 1, further comprising a controller for adjusting a temperature of the cooling/heating device to form the ice in the first chamber and to move the ice from the first chamber to the second chamber with the moving mechanism.

3. The freezing desalination system as recited in claim 1, further comprising a controller for adjusting a temperature of the cooling/heating device to form the ice in the first chamber.

4. The freezing desalination system as recited in claim 3, wherein the controller reverses current being supplied to the cooling/heating device so that ice formed on the conductive interface separates from the conductive interface.

5. The freezing desalination system as recited in claim 4, wherein the controller signals the moving mechanism to move the ice from the first chamber to the second chamber.

6. The freezing desalination system as recited in claim 1, wherein the first chamber and second chamber are insulated to minimize heat conductivity.

7. The freezing desalination system as recited in claim 1, wherein the first chamber and second chamber are made of a material to minimize heat conductivity.

8. The freezing desalination system as recited in claim 1, wherein the cooling/heating device is a thermoelectric cooler (TEC).

9. A freezing desalination method, comprising:
cooling salt water in a first chamber with a conductive interface having a cooling/heating device, the conductive interface separating the first chamber from a second chamber containing fresh water;
reversing a current supplied to the conductive interface by a power source, when ice forms on the conductive interface, thereby allowing the ice to detach from the conductive interface; and
moving the ice from the first chamber to the second chamber with a moving mechanism thereby melting the ice in the second chamber.

10. The freezing desalination method as recited in claim 9, further comprising adjusting a temperature of the cooling/heating device with a controller to form the ice in the first chamber.

11. The freezing desalination method as recited in claim 10, further comprising reversing the current being supplied to the cooling/heating device, from the power source, with the controller, so that the ice formed on the conductive interface in the first chamber separates from the conductive interface.

12. The freezing desalination method as recited in claim 9, wherein the first chamber and second chamber are insulated to minimize heat conductivity.

13. The freezing desalination method as recited in claim 9, wherein the first chamber and second chamber are made of a material to minimize heat conductivity.

14. The freezing desalination method as recited in claim 9, wherein the cooling/heating device is a thermoelectric cooler (TEC).

* * * * *